F. J. BYRNE.
DEVICE FOR HOLDING TRAPS.
APPLICATION FILED APR. 12, 1920.

1,409,924.

Patented Mar. 21, 1922.
2 SHEETS—SHEET 1.

Inventor:
Francis J. Byrne
By Cyrus W. Rice
His Attorney

F. J. BYRNE.
DEVICE FOR HOLDING TRAPS.
APPLICATION FILED APR. 12, 1920.

1,409,924.

Patented Mar. 21, 1922.
2 SHEETS—SHEET 2.

Inventor:
Francis J. Byrne
By Cyrus W. Rice
his Attorney.

UNITED STATES PATENT OFFICE.

FRANCIS J. BYRNE, OF CANNON TOWNSHIP, KENT COUNTY, MICHIGAN.

DEVICE FOR HOLDING TRAPS.

1,409,924.   Specification of Letters Patent.   Patented Mar. 21, 1922.

Application filed April 12, 1920. Serial No. 373,259.

*To all whom it may concern:*

Be it known that I, FRANCIS J. BYRNE, a citizen of the United States residing at Cannon Township, in the county of Kent and State of Michigan, have invented new and useful Improvements in Devices for Holding Traps, of which the following is a specification.

The present invention relates to devices for holding traps, such as are commonly known as "steel traps;" and its general object is to provide means for securely holding a trap to an anchorage and in such position as to be readily operated; a more particular object is to provide such a holder having springable members adapted to releasably hold the trap and also having springable members adapted to releasably secure the holder to its anchorage; a further object being to provide specific means for very effectively attaining such ends.

These and any other objects hereinafter appearing are attained by, and the invention finds preferable embodiment in, the structure hereinafter particularly described and illustrated by the accompanying drawings, in which.

Figure 1:
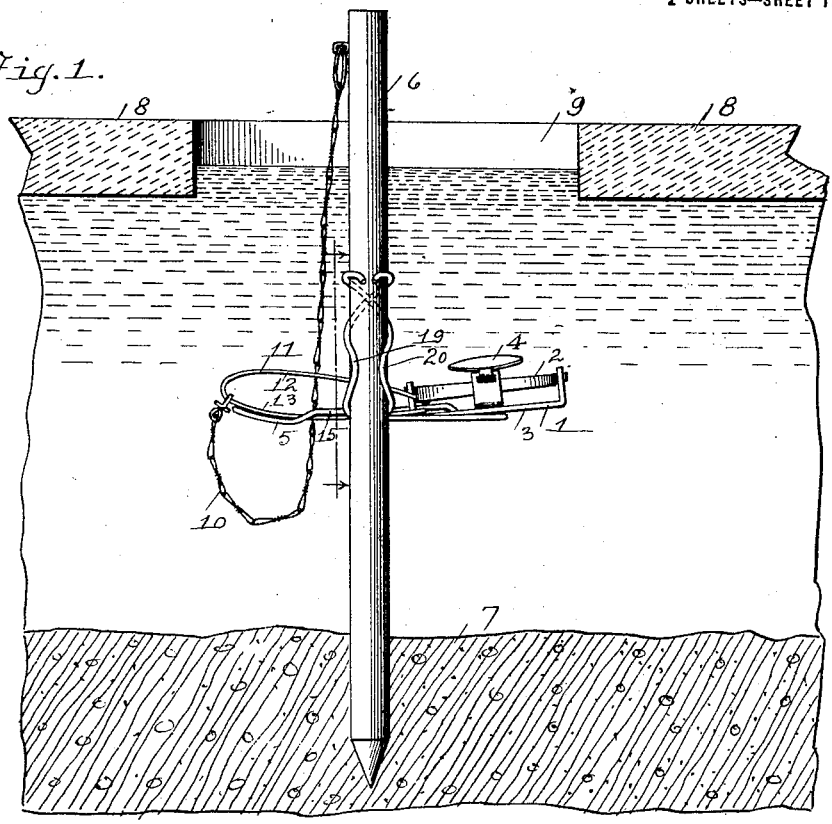
Figure 1 is a view of a trap secured by my holder to an anchoring rod and positioned in water under its ice covering.
Figure 5:
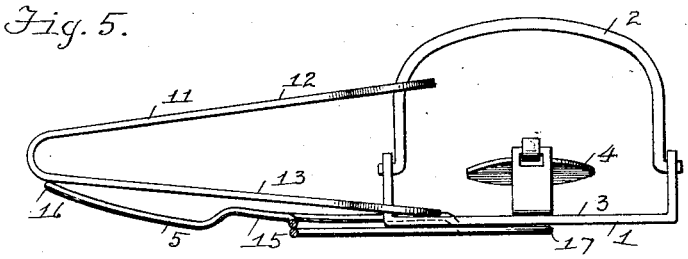
Figure 5 is a side view of the closed trap and of the holder, parts of the holder being broken away.

In the embodiment of the invention chosen for illustration by the drawings and for detailed description in the body of this specification, the trap designated generally by 1, of the type commonly called a "steel trap" having the jaws 2, 2, body portion 3 and trigger 4, is held by my trap holder, designated generally by 5, which is secured to a suitable anchorage, as the rod 6, which in Figure 1 is shown driven into the ground 7 at the bottom of a stream or pond, which in said figure is covered with ice 8, a hole 9 being cut therethrough to admit the rod, the trap and the trap holder. These parts are desirably placed in paths frequented by the animals to be trapped. The trap is secured as by its chain 10 to the rod 6 or other suitable fixed object. The trap is provided with the usual operating spring 11 compressed when the trap is "set," as shown in Figure 3, so that the spring's upper and lower leaves 12, 13 are somewhat bowed, as shown in said figure; but when the trap is "sprung" these leaves straighten as shown in Figure 5.

Figure 2:
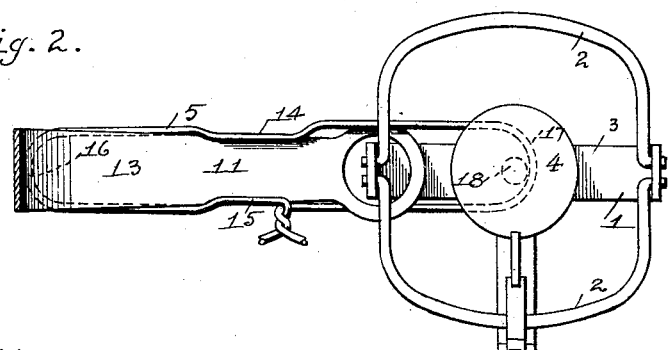
Figure 2 is a top plan view of an open trap (the upper leaf of its operating spring being broken away) and of the holder, parts of which are broken away.
Figure 3:
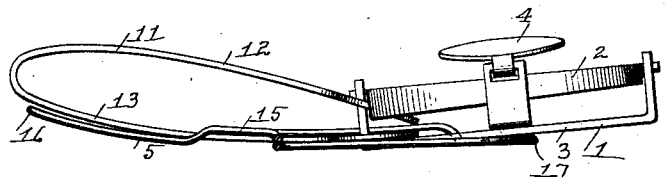
Figure 3 is a side view of said trap and holder, parts of the holder being broken away.
Figure 4:
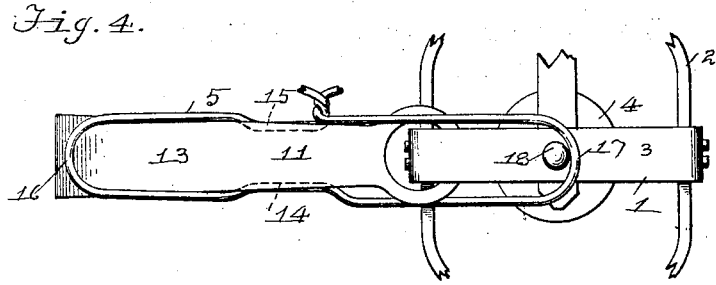
Figure 4 is a bottom plan view of the same, parts of the trap and holder being broken away.

In the construction illustrated, my trap holder is formed from a single piece of heavy spring wire and has members 14, 15 holdingly engaging between them the opposite edges of the lower leaf 13 of the trap's operating spring, as shown in Figures 2, 3 and 4, said spring being compressed and its leaves bowed by the "setting" of the trap. These members 14, 15 are sprung apart by the straightening of the leaf 13 of the more powerful trap operating spring 11, when said trap spring is released by the "springing" of the trap. These two members 14, 15 of the trap holder are connected by bight portions, 16, 17, one of which 17, engages a lug 18 carried on the under side of the body portion 3 of the trap, in the secured position of the trap to the holder.

Figure 9:
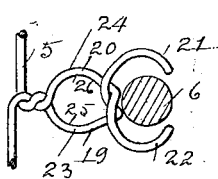
Figure 9 is a top plan view of the same, the anchorage being sectioned on line 9—9 of Figure 8.
Figure 11:
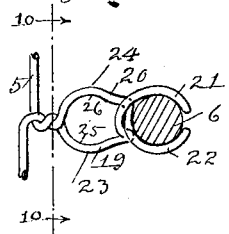
Figure 11 is a top plan view of the same.
Figure 7:
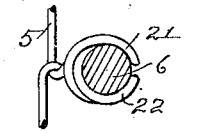
Figure 7 is a top plan view of the same, the anchorage being sectioned on line 7—7 of Figure 6.
Figure 8:
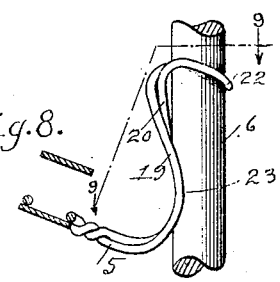
Figure 8 is a side view of said members illustrating the same in position to be secured to the anchorage.
Figure 10:
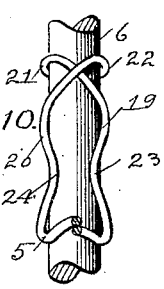
Figure 10 is a front view of said members in the process of being secured to the anchorage, these members being sectioned on a plane corresponding to line 10—10 of Figure 11.
Figure 6:
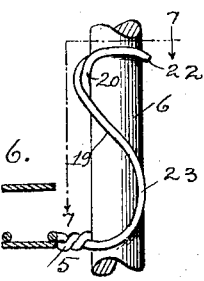
Figure 6 is a side view of the members of the holder whereby the same is secured to its anchorage, illustrating said members in their securing position.

The trap holder is releasably secured to the anchoring rod 6 by the holder's pair of spring members 19, 20. These members have respectively end portions 21, 22 adjacently concave and adapted to holdingly engage the anchoring rod between them. These members cross each other, so that when their middle portions 23, 24 are sprung toward each other, the end portions 21, 22 separate to admit the rod therebetween as seen in Figure 9, whereupon the pressure on the portions 23, 24 being released, the end portions 21, 22 enclasp the rod between them as seen in Figure 11. The rod thus held between said end portions of the members 19, 20, may now be moved laterally towards said members from the position shown in Figures 10 and 11 and into the position shown in Figures 6 and 7, the rod in thus moving pressing the portions 23, 24 apart to insert itself sidewise between them. When the rod is thus moved laterally into the secured position seen in Figures 6 and 7, it is held between said portions 23, 24 in their concaved inner sides 25, 26. When it is desired to disengage the trap holder from the anchoring rod, this process is reversed.

The invention being intended to be pointed out in the claims, is not to be limited to or by details of construction of the particular embodiment thereof illustrated by the drawings or hereinbefore described.

I claim:

1. In a holder for a trap of the character described; spring members adapted to releasably hold the trap's operating spring and pressing against the opposite sides of said spring and against the opposite edges thereof adjacent its said sides and at points on said edges directly opposite each other; and members adapted to releasably engage an anchoring rod holdingly.

2. In a holder for a trap of the character described; spring members adapted to hold the trap's operating spring in its bowed set position and to be released therefrom by said spring's straightening movement from its said position, said spring members in their holding engagement with said spring pressing against the opposite sides thereof and against the opposite edges thereof adjacent its said sides.

3. In a holder for a trap of the character described; spring members having connecting bight portions and being adapted to releasably engage holdingly the opposite edges of the trap's operating spring, one of said bight portions being adapted to engage a lug carried by the body of the trap and means for anchoring the holder.

4. In a holder for a trap of the character described; means for securing the trap to the holder; a pair of spring members having respective end portions adapted to releasably engage an anchoring rod holdingly and intermediate portions continuing from said end portions respectively and crossing each other and adapted to releasably engage said rod holdingly on its sides opposite to its sides respectively engaged by said end portions.

In testimony whereof I have hereunto set my hand at Grand Rapids, Michigan, this 2nd day of April, 1920.

FRANCIS J. BYRNE.